United States Patent Office

3,398,109
Patented Aug. 20, 1968

3,398,109
BLACK ENAMELS
John F. Hardy and Porter F. Gridley, Andover, Mass., assignors to Cabot Corporation, Boston, Mass., a corporation of Delaware
No Drawing. Filed June 1, 1965, Ser. No. 460,514
15 Claims. (Cl. 260—29.4)

ABSTRACT OF THE DISCLOSURE

Essentially non-aqueous, thermosetting, black enamel coating compositions of the true solution type having unusually high color and jetness are disclosed. These comprise about 20–60% by weight of said composition of a thermosetting resin dissolved in an organic solvent, said thermosetting resin being characterized in that a major portion thereof is produced from monomers selected from the group consisting of organic esters of acrylic acid, organic esters of methacrylic acid and derivatives thereof and about 1–6% by weight of said composition of a channel carbon black which has been subjected to oxidative after treatment, said carbon black characterized as having physically associated therewith both water at about 5–15% by weight of said black and an anionic dispersing agent at about 5–20% by weight of said black.

---

This invention relates to carbon black pigments. More precisely, the invention disclosed herein relates to a novel method for obtaining high color development of carbon black pigments in certain solvent type enamel systems based upon acrylic resins, especially certain modified acrylic resins.

Solvent type enamels based upon thermosetting acrylic resins are well known to the art and presently enjoy a wide range of applications because of their excellent color retention properties together with their exceptional ability to resist abrasion and chemicals. Included among the more important applications and uses which such acrylic type enamels enjoy today are as automotive finishes, aerosol paints, exterior house paints and interior wall paints. Broadly, the acrylic enamels of interest here may be defined as essentially non-aqueous or solvent type systems in which the major portion of the resin is a thermosetting acrylic type resin produced by the polymerization of monomers chosen from the group consisting of organic esters of acrylic acid, organic esters of methacrylic acid and derivatives thereof with or without minor amounts of other compatible monomers. Examples of typical resins of this type are ethyl methacrylate, n-butyl methacrylate, methyl acrylate, 2-ethylhexyl acrylate, ethyl acrylate and copolymers thereof such as ethylmethacrylate/methyl methacrylate. These resins are utilized in solution form in the preparation of the enamels of interest to the present invention. Generally, the most widely used solvents for such resins are toluene or xylene. However, other suitable solvents include benzene, butyl acetate, acetone, ethyl acetate, methyl isobutyl ketone. Cellosolve acetate and many others or compatible mixtures of these. In general the amount of resin in such enamel systems may vary from about 20% to about 60% of the total enamel or even somewhat higher in certain cases. Other ingredients which can be included in the acrylic type enamels of this invention are plasticizers and/or polymeric plasticizers such as polypropylene glycol, and/or resins such as melamine, styrene, epoxy or other such compatible resins or mixtures of these. In such modified acrylic enamels, the proportion of acrylic to melamine, epoxy or other resin may vary depending upon the properties desired in the ultimate product but the acrylic resin generally comprises the major constituent of the total resin. These modified acrylic enamels are relatively new to the art and presently enjoy many specialized applications especially as topcoat enamels in the automotive industry. A more complete exposition of the enamel systems and the resins and other ingredients comprising same included within the scope of the present invention may be found in Volume 33 (March 1961) of the Official Digest of the Federation of Societies of Paint Technology on pages 351 and 353–364. Also, a more detailed discussion of the particular acrylic resin solutions utilized in the unmodified and modified formulations set forth in pages 355 and 356 respectively of the above-mentioned Official Digest may be found on pages 12–18 of Resin Review, Volume XI, Number 1 (Winter 1961) published by Rohm and Haas for users of synthetic resins and in U.S. Patent 2,955,055.

It is well known to those skilled in the art that black is one of the most difficult colors to obtain consistently on a high quality basis in any of the acrylic type enamels and especially in the modified acrylic type enamel systems. This is presently believed to be due chiefly to the fact that the carbon black pigment is very difficult to grind into these systems with optimum color development. Accordingly, any method whereby a carbon black pigment may be incorporated into the many diverse acrylic type enamel systems so as to consistently develop high color and jetness therein would be a notable contribution to the art.

The principal object of the present invention is to provide a black acrylic type enamel system or formulation of unusually high color and jetness.

Another more specific object of the invention is to provide a black, modified acrylic type enamel system having superior color properties, which enamel is especially useful for automotive topcoat finishes.

Other objects and advantages of the present invention will appear hereinafter and will be obvious to those well skilled in the art.

We have found that the most desirable color development in black acrylic type enamels is best achieved by the use therein of an aftertreated carbon black pigment. For example, we have found that good color and jetness in such enamels is generally obtained when an amount of from about 1 to about 6% and preferably from about 1 to about 4% by weight or slightly higher of the enamel of a channel carbon black which has been subjected to a high temperature air aftertreatment step is utilized as the pigment therein. More particularly, we have found that high color and jetness in such enamels—especially in the modified acrylic enamels—is best obtained by utilizing as a pigment therein a medium color channel black which is produced by a unique combination of aftertreatment steps including high temperature air aftertreatment together with subsequent treatment of the black with nitric acid or nitric oxides. The particular pigments which we have discovered to be most desirable and the process for producing same are described in detail in pending U.S. application S.N. 159,786 filed on Dec. 15, 1961 by Jordan and Hardy now Patent No. 3,226,244. Essentially this black is produced by a two step aftertreatment of a specific channel type black. In the first step, a black having an average electron microscope particle diameter of at least 15 millimicrons and a porosity below about 200 is subjected to high temperature air aftertreatment to obtain an intermediate product having a porosity value between about 220 and about 400. By porosity of a black, we mean the difference obtained by deducting from the nitrogen surface area of a black (determined by the method of Brunauer-Emmett-Teller), that surface area of the black obtained by calculating same from the observed average electron microscope particle diameter according to the following formula: Square meters per gram = 60,000/1.82 (E.M. particle diameter in angstroms).

The difference obtained is generally believed by those well skilled in the art to be primarily due to the presence of small openings or pores in the surface of the black. The intermediate product so obtained, which has a percent volatile of at least about 8%, is subsequently treated with aqueous solutions of nitric acid or nitric oxides and dried to produce a product having a percent volatile which is increased by at least about 40% over that of the intermediate product. In the practice of our invention, however, we especially prefer those blacks which have been subsequently subjected to treatment with nitric acid solutions. Hereinafter, the product resulting from the above-mentioned two step aftertreatment will be referred to as 2×A type channel black.

Quite surprisingly, we have discovered that although most of the above-mentioned blacks and especially the above-mentioned 2×A type blacks produce acrylic type enamels of good quality and jetness, nevertheless, a substantial further improvement in color and jetness of acrylic type enamel systems may be obtained by conducting the grinding step involved in the preparation of such enamels in the presence of a particular amount of moisture and a particular amount of an anionic dispersing agent. Accordingly, our invention essentially resides in the discovery that the addition of moisture and an anionic dispersing agent in controlled minor amounts to an aftertreated channel black imparts superior color and jetness to acrylic type enamel systems and especially to modified acrylic type enamels in which the black is utilized as a pigment. Also, included within the scope of our invention and constituting the most preferred embodiment thereof is our discovery that an especially desirable degree of color improvement in black acrylic enamel systems is obtained when the black utilized as a pigment therein is the above-mentioned 2×A type channel black.

The exact amount of moisture which we have found to be critical and which when present with the black together with the dispersing agent during the grinding step imparts the improvements described above, may range from about 5 to about 15% by weight of the black. More preferably, the amount of moisture for optimum color development corresponds to amounts from about 8 to about 12% by weight of the black. When amounts of moisture in excess of about 15% by weight of the black are utilized, the color development is impaired or otherwise adversely affected. Many methods of adding moisture or adjusting the moisture content of a carbon black pigment are known to those skilled in the art and such methods do not constitute a critical element of our invention. The moisture can be absorbed on the black at any time prior to, or can be added during, the grinding or milling step involved in the preparation of such enamels.

The amount of anionic dispersing agent which must be present with the black is also a critical feature of our invention. The amount thereof, may vary from about 5 to about 20% by weight of the black with the most optimum color development being obtained when amounts from about 7 to about 15% by weight of the black are utilized. We have found that suitable results are obtained when most of those anionic dispersing agents well known to those skilled in the art are utilized in the practice of our invention. However, we especially prefer as the anionic dispersing agent a sodium salt of alkyl naphthalene sulfonic acid, such as that sold by Dewey and Almy Co. under the tradename Daxad 11. Accordingly, the preferred enamels of our invention constitute those obtained by grinding together with the mill paste ingredients of an acrylic type and modified acrylic type enamel systems, a pigment comprising a medium color channel black which has been subjected to both high temperature air aftertreatment and nitric acid treatment e.g. a 2×A type black, and having absorbed thereon or otherwise associated therewith from about 8 to about 12% moisture by weight of the black together with from about 5 to about 15% of a polymerized sodium salt of alkyl naphthalene sulfonic acid by weight of the black.

The Daxad 11 or other such anionic dispersing agent, like the moisture, may also be absorbed on the black at any time prior to, or may be added during, the grinding operation. In practice, generally all of the pigment to be utilized in the formation together with the amount of water and dispersing agent desired are milled or ground together with a portion of the resin solution and other mill paste ingredients for a period of about 20 hours. Thereafter, the other ingredients including additional resin material may be added to the mill paste or pigment phase ingredients in subsequent "reduction" or "let down" steps. Also if desired, the black may be treated with the desired amount of moisture and dispersing agent at any time prior to the grinding step. For example, such treatment may occur while the black is being pelletized or at any other convenient time prior to its introduction to the mill paste ingredients of the enamel system.

The following examples are offered in order to enable those well skilled in the art to better understand and practice our invention. These examples are illustrative in nature and are not to be construed in any fashion so as to limit our invention beyond that imposed by those limitations set forth in the claims which follow hereinafter.

Example 1

The following acrylic enamel formulations were compounded as follows:

The mill paste ingredients of each of the enamels set forth in Table I were added to a steel quart receptacle half the volume of which was occupied by 7 pounds and 5 ounces of ½" diameter steel balls and about 4 pounds and 11 ounces of ¼" diameter steel balls. The receptacle was closed and placed on power driven rollers and rolled for about 20 hours. The acrylic resin solution used in each of the following enamels contained about 50% resin by weight of the total solution. The initial moisture on the black utilized in the following formulations was determined and found to be about 5% by weight of the total black.

TABLE I

| Enamel No. | 1 | 2 |
|---|---|---|
| Acrylic Resin Solution [1] (gms.) | 360 | 354 |
| Black Pearls 46 (black)[2] (gms.) | 40 | 40 |
| Daxad 11 (gms.) | | 4 |
| Water (gms.) | | 2 |

[1] The acrylic resin solution utilized consisted of about 50% by weight of a copolymer of ethyl hexyl acrylate and methyl methacrylate in about 90% xylol/about 10% butanol.
[2] Black Pearls 46 is a conventional high color, high temperature air aftertreated channel black produced by Cabot Corporation and has a volatile content of about 14%, a nitrogen surface area of about 800 meters$^2$ per gram, and an average electron microscope particle diameter of about 13 millimicrons.

After milling the above formulations for about 20 hours, the following additional ingredients were added to 40 grams of each of the formulations of Table I. Each mixture was then shaken on a Red Devil paint shaker for 3 minutes.

Acrylic resin solution (gms.) (the same as utilized previously) _____ 93.2
Xylene (gms.) _____ 9.2

The color properties of each of the resulting enamels were determined on glass panel drawdowns of the black enamels using the "Coloreye" produced by Instrument Development Laboratories, Inc., of Attleboro, Mass., and described in detail in their "Instruction Manual No. 1000 G for Model D Coloreye."

The "Coloreye" measures light reflectance of a sample compared to a standard at three wavelentghs in the visible light spectrum. The standard use in this study was Enamel No. 1. The lower reflectivity readings are considered the most desirable since lower reflectivity indicates greater absorption and darker color. The following data were obtained:

TABLE II

| Enamel No. | Coloreye Relative Reflectance | | |
|---|---|---|---|
| | X | Y | Z |
| 1 | 100 | 100 | 100 |
| 2 | 82.5 | 90 | |

The above example illustrates the benefits which are obtained when the teachings of the present invention are applied to an enamel system wherein an acrylic resin comprises all or substantially all of the base resin. However, recently modified acrylic type enamels have been developed and these presently enjoy considerable success especially as enamels for automotive finishes. In these modified acrylic type enamels, melamine, epoxy and/or other such compatible resins are utilized in varying amounts as minor components of the base resin. Such modified acrylic enamels have improved gloss and/or strength when compared to enamels containing an acrylic as the sole base resin. The following example illustrates the improvements in color obtained by applying the teachings of our invention to the modified acrylic type enamel systems.

Example 2

The following formulations were prepared and milled for 20 hours in accordance with the procedure set forth in Example 1. All blacks had about 5% moisture.

TABLE III.—MILL PASTE FORMULA

| Enamel No | 3 | 4 | 5 | 6 | 7 | 8 |
|---|---|---|---|---|---|---|
| Acrylic resin solution [1] (gms.) | 216 | 212 | 216 | 212 | 216 | 212 |
| Resimene 882 [2] (gms.) | 144 | 142 | 144 | 142 | 144 | 142 |
| MP 125 [3] (gms.) | | | 40 | 40 | | |
| Black Pearls 46 (gms.) | | | | | 40 | 40 |
| Neospectra beads A. G.[4] (gms.) | 40 | 40 | | | | |
| Daxad 11 (gms.) | | 4 | | 4 | | 4 |
| Water (gms.) | | 2 | | 2 | | 2 |

[1] The acrylic resin solution utilized contained about 50% by weight of a copolymer of methyl methacrylate and ethyl methacrylate in 90% xylol/10% butanol.
[2] Trade name of Monsanto Chemical Co. for a solution in xylol of a butylated melamine formaldehyde resin containing about 66% by weight of the resin, as explained in Product Information Bulletin No. 1094 reprinted by Monsanto Chemical Co. in April 1962 to supersede the original and substantially identical bulletin first published in 1953.
[3] MP 125 is a 2XA type channel black produced by Cabot Corporation and having a volatile content of about 16%, a nitrogen surface area of about 480 square meters per gram, and an average electron microscope particle diameter of about 17 millimicrons.
[4] Neospectra Beads A. G. is a high color, high temperature, air aftertreated channel black having a surface area of about 900 square meters per gram and an average electron microscope particle diameter of about 18.6 millimicrons. Neospectra Beads A. G. is produced by Columbian Carbon Co.

The following ingredients were added to 40 grams of each of the formulations of Table III:

Acrylic resin solution (gms.) (the same utilized in preparing the mill paste) _____ 82
Resimene 882 (gms.) _____ 11.2
Xylene (gms.) _____ 9.2

Each mixture was then shaken for 3 minutes on a Red Devil paint shaker. Accordingly, each of the final enamels contained the following:

| | Percent |
|---|---|
| Acrylic solids | 36.3 |
| Melamine solids | 11.7 |
| Black | 2.8 |
| Solvent | 49 |

The color properties of each enamel were determined in accordance with the "Coloreye" procedure set forth in Example 1, and using Enamel No. 3 as the standard, the following data were obtained:

TABLE IV

| Enamel No. | Coloreye Relative Reflectance | | |
|---|---|---|---|
| | X | Y | Z |
| 3 | 100 | 100 | 100 |
| 4 | All readings less than 70 | | |
| 5 | 81 | 80 | 82.5 |
| 6 | All readings less than 70 | | |
| 7 | 73 | 76 | 92.5 |
| 8 | All readings less than 70 | | |

Also in order to demonstrate the superiority of MP 125, e.g. a 2×A type black as the pigment in the modified acrylic type enamels, the color properties of the following enamels were determined by the Coloreye Technique as above but using Enamel No. 6 as the standard. The following data were obtained:

| Enamel No. | Coloreye Relative Reflectance | | |
|---|---|---|---|
| | X | Y | Z |
| 4 | 145+ | 145+ | 145+ |
| 6 | 100 | 100 | 100 |
| 8 | 145+ | 145+ | 145+ |

The benefits which flow from the practice of our invention will be obvious to those well skilled in the art from the above example. Substantially similar results may also be obtained when other anionic dispersing agents are utilized in accordance with the teachings of the present invention. Especially preferred, however, is the abovementioned Daxad 11. Other suitable dispersing agents for the purposes of the present invention are the sodium salts of sulfonic acid condensates such as Tamol N sold by Rohm and Haas Co. and other such dispersing agents which may be generically defined as sodium salts of the aldehyde condensation products of sulfonated naphthalenes.

Example 3

The following formulations were prepared and milled for 20 hours in accordance with the procedure set forth in Example 1. All blacks had about 5% moisture.

TABLE V

| Enamel No | 10 | 11 | 12 | 13 |
|---|---|---|---|---|
| Acrylic resin solution [1] (gms.) | 216 | 212 | 212 | 211 |
| Resimene 882 (gms.) | 144 | 142 | 140 | 140 |
| Black (MP 125) (gms.) | 40 | 40 | 40 | 40 |
| Daxad 11 (gms.) | | 4 | 6 | 6 |
| Water (gms.) | 2 | 2 | 2 | 3 |

[1] The same resin was utilized as in Example 1.

Accordingly, in the various enamel formulations set forth in Table V, the MP 125 black had the following amounts of Daxad 11 and moisture absorbed thereon or otherwise associated therewith during the grinding step.

TABLE VI

| Enamel No. | Daxad Conc. on Black, percent by weight of total black | H₂O Conc. on Black, percent by weight of total black |
|---|---|---|
| 10 | 0 | 10.5 |
| 11 | 10 | 10.5 |
| 12 | 15 | 10.5 |
| 13 | 15 | 13.2 |

After grinding, the following ingredients were added to 40 grams of each of the formulations of Table V.

Acrylic resin solution (gms.) (same as used in Table V) _____ 82
Resimene 882 (gms.) _____ 11.2
Xylene (gms.) _____ 9.2

Each mixture was then shaken for 3 minutes on a Red Devil paint shaker.

The color properties of each enamel were determined in accordance with the "Coloreye" procedure set forth in Example 1 using the Enamel No. 11 as the standard. The following data were obtained:

TABLE VII

| Enamel No. | Coloreye Relative Reflectance | | |
|---|---|---|---|
| | X | Y | Z |
| 10 | 145+ | 145+ | 145+ |
| 11 | 100 | 100 | 100 |
| 12 | 81.5 | 81 | 83 |
| 13 | 103 | 102 | 104 |

It will be obvious from the above example that the best color development in modified acrylic type enamels may only be obtained when both the dispersing agent and the moisture are present with the black in the mill paste during the grinding thereof. Moreover, it will also be obvious that with MP 125, the best color development is obtained when the amount of dispersing agent is as high as about 15% by weight of the black while the amount of moisture should generally not exceed about 11%. As will be noted from Enamel No. 13, some impairment of color properties appears to occur when the amount of moisture exceeds 11% even when the amount of dispersing agent is maintained at 15%.

Since the essence of our invention resides in the discovery that high color is best achieved in black thermosetting acrylic type enamel systems by utilizing therein, as a pigment, an aftertreated channel black having associated therewith or absorbed thereon a particular amount of moisture together with an anionic dispersing agent, many modifications of the incidental features involved in achieving this effect are contemplated. Accordingly, various ingredients utilized in such enamel systems for specialized purposes such as dryers, modifiers, solvents, plasticizers etc. may also be included in such compositions. Also, various manners of grinding or mixing the constituents, and modifications of the mill paste constituents of the enamels may also be utilized together with other modifications well known to those skilled in the art without departing from the spirit and scope of our invention.

Having described our invention together with a preferred embodiment thereof, what is claimed is:

1. In the process for producing true solution form, essentially non-aqueous black enamels the primary resinous vehicle of which is an acrylic resin, involving the step of grinding together the mill paste ingredients which comprises (1) a solution in organic solvents of a thermosetting resin the major portion of which is produced from monomers selected from the group consisting of organic esters of acrylic acid, organic esters of methacrylic acid and derivatives thereof, and (2) a carbon black pigment which has been subjected to oxidative aftertreatment with air at high temperatures; the improvement which comprises including in said mill paste by weight based upon the weight of said carbon black in both instances, between about 5 to about 15% water and between about 5 to about 20% of anionic dispersing agent.

2. The process of claim 1 wherein the amount of said water is between about 8 to about 12% by weight of said black and the amount of said anionic dispersing agent is between about 5 to about 15% by weight of said black.

3. The process of claim 1 wherein said carbon black pigment is a channel black produced by the high temperature air aftertreatment of a channel black having an electron microscope particle diameter of at least 15 millimicrons and a porosity below about 200 to produce a product having a porosity between about 220 to about 400 and the subsequent treatment of said product with a compound selected from the group consisting of nitric acid and nitric oxides, to increase the volatile content thereof by at least about 40%.

4. The process of claim 1 wherein said anionic dispersing agent is a sodium salt of an alkyl naphthalene sulfonic acid.

5. The process of claim 1 wherein said acrylic resin is a copolymer of methyl methacrylate and ethyl acrylate.

6. The process of claim 1 wherein said acrylic resin is a copolymer of methyl methacrylate and ethylhexyl methacrylate.

7. The process of claim 1 wherein said enamel also contains a compatible melamine-formaldehyde resin.

8. An essentially non-aqueous, thermosetting black enamel coating composition of the true solution type having unusually high color and jetness, which comprises:
  (a) about 20–60% by weight of said composition of a thermosetting acrylic resin dissolved in an organic solvent, said acrylic resin characterized as having the major portion thereof produced from monomers selected from the group consisting of organic esters of acrylic acid, organic esters of methacrylic acid and their derivatives, with about
  (b) 1–6% by weight of said composition of a channel carbon black which has been subjected to oxidative aftertreatment with air at high temperatures, said carbon black being characterized by having physically associated therewith water at about 5–15% by weight of said black and an anionic dispersing agent at about 5–20% by weight of said black.

9. The composition of claim 8 wherein prior to being contacted with said thermosetting resin said carbon black is characterized as having physically associated therewith water at about 8–12% by weight of said black and an anionic dispersing agent at about 5–15% by weight of said black.

10. The composition of claim 8 wherein said anionic dispersing agent is a sodium salt of an alkyl naphthalene sulfonic acid.

11. The composition of claim 8 wherein said thermosetting resin is a copolymer of methyl methacrylate and ethyl acrylate.

12. The composition of claim 8 wherein said thermosetting resin is a copolymer of methyl methacrylate and ethylhexyl methacrylate.

13. The composition of claim 8 wherein there is also contained a compatible melamine-formaldehyde resin.

14. The composition of claim 8 wherein said carbon black is produced by the high temperature air aftertreatment of a channel carbon black having an electron microscope particle diameter of at least 15 millimicrons and a porosity below about 200 to produce a product having a porosity of between about 200–400, and by the subsequent treatment of said product with a compound selected from the group consisting of nitric acid and nitric oxides to increase the volatile content thereof at least about 40%.

15. The composition of claim 14 wherein the volatile content of said carbon black is increased by the treatment thereof with nitric acid.

References Cited

UNITED STATES PATENTS

| 2,544,363 | 3/1951 | Siemons | 106—307 |
| 2,955,055 | 10/1960 | Souder et al. | 260—86.1 |
| 3,226,244 | 12/1965 | Jordan et al. | 106—307 |

MURRAY TILLMAN, *Primary Examiner.*

W. J. BRIGGS, *Assistant Examiner.*